Sept. 6, 1949.  E. HENDERSON  2,481,013
PIPE JOINT TEST PLUG
Filed March 24, 1947.
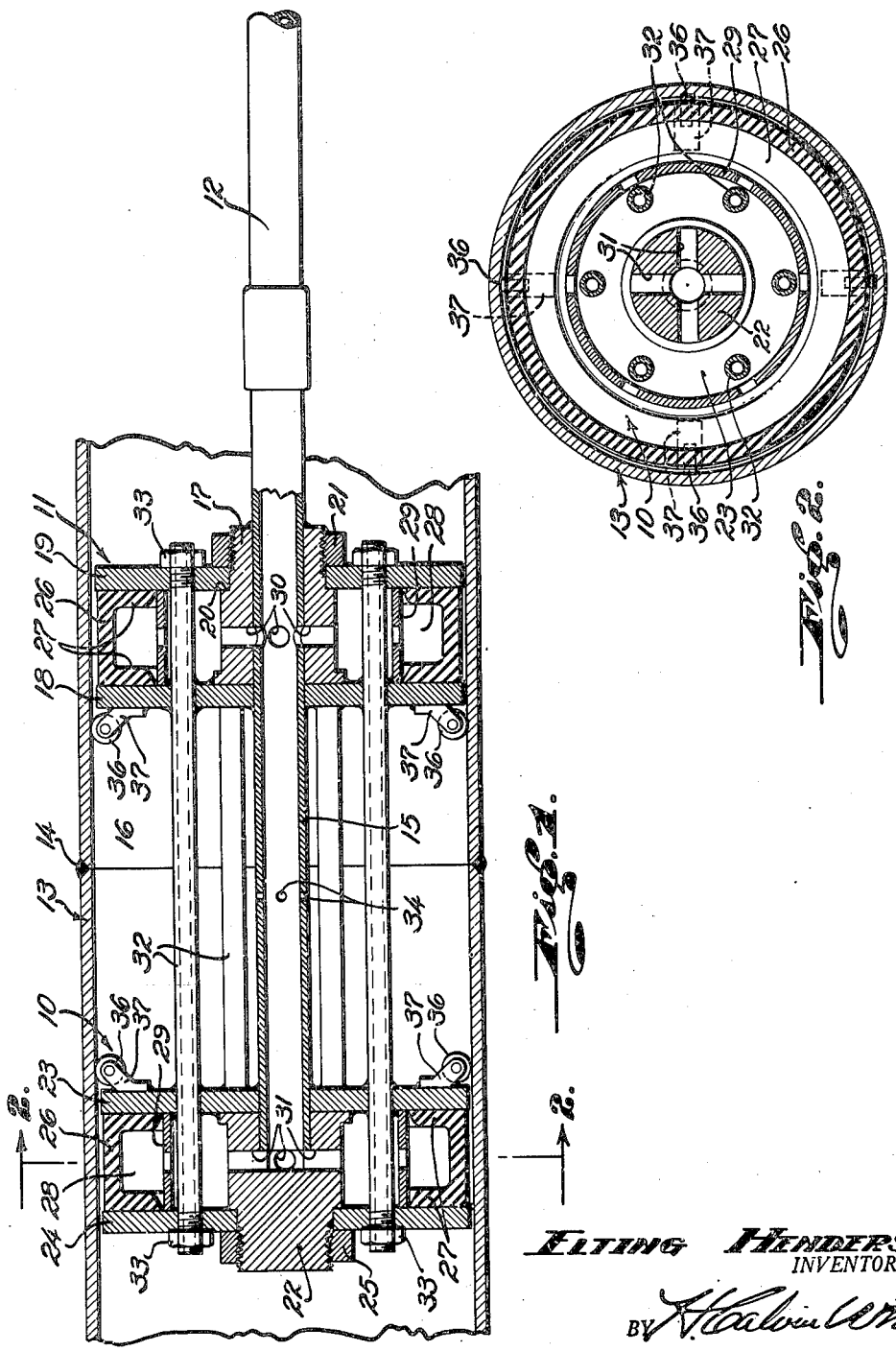
ELTING HENDERSON
INVENTOR.
BY H. Calvin White
ATTORNEY Patented Sept. 6, 1949

2,481,013

UNITED STATES PATENT OFFICE 2,481,013

PIPE-JOINT TEST PLUG

Elting Henderson, Whittier, Calif.

Application March 24, 1947, Serial No. 736,665

6 Claims. (Cl. 138—90)

This invention has to do with improved devices for determination of leaks in pipes, and is directed particularly to a fluid pressure packer assembly especially adapted for the detection of leaks in welded joints between sections of soil pipe, e. g. gas and water mains.

My primary object is to provide a leak testing device characterized by the provision of a pair of fluid pressure responsive packers adapted to be expanded into fluid tight engagement with the pipe wall at opposite sides of the joint, and having between them a chamber for reception of the high pressure fluid to be used in testing for leaks. Particularly the invention contemplates a testing apparatus comprising a pair of packer assemblies connected to a pressure fluid supply tube, the fluid being conducted to the packers and the chamber between them in a sequential relationship such that the fluid pressure first expands the packers to seal the chamber, and then communicates its full working pressure to the chamber.

According to its preferred form, the invention contemplates connection of the fluid pressure supply tube with a pair of axially spaced packer bodies each including a pair of spaced rigid plates or end walls between which is confined at the outside of a fluid receiving cavity an annular, radially expansible packer. By simple determination of the relative sizes of passages or openings through which the testing fluid is delivered to the packer cavities and the inter-packer chamber, sealing expansion of the packer and development of the maximum chamber pressure may be caused to occur sequentially in the manner stated.

For various reasons it may be desirable to equalize the pressures in the pipe at opposite sides of the testing device, either during or subsequent to running the device to testing position within the joint. For this purpose provision is made for communicating pressure through the packer bodies and inner packer chamber independently of communication with the testing fluid, as by means of tubular tie bolts serving the dual purposes of interconnecting the packer bodies and serving as pressure equalizing conduits.

All of the various features and objects of the invention, as well as the details of a preferred embodiment, will be understood more clearly from the following detailed description of the accompanying drawing, in which:

Fig. 1 is a view showing the apparatus in longitudinal section; and

Fig. 2 is a cross-section on line 2—2 of Fig. 1.

The testing apparatus comprises a pair of axially spaced circular packer bodies 10 and 11 connected to a testing fluid supply tube 12 adapted to be run into the pipe 13 to the position illustrated by Fig. 1, in which the packers are positioned at opposite sides of the welded joint 14. Bodies 10 and 11 are carried on a tube 15 coupled to the pipe 12 for delivery of the testing fluid to both the packer bodies and the chamber 16 between them. Tube 15 carries a support 17 against the inner end of which is mounted a fixed plate 18 serving as the inner wall of the packer body 11. Its outer wall is formed by a second annular plate 19 releasably engaged against shoulder 20 by nut 21 threaded on the outer end of the support. The body 10 similarly comprises an end support 22 on the tube 15 and against which is fixed the inner plate 23 and a removable outer plate 24 held in place by nut 25.

Each of the packer bodies contains a radially expansible gasket 26, the lips 27 of which are pressed into sealing engagement with the confining plates by fluid communicated from tube 15 to the annular cavities 28. Each cavity contains an apertured cylindrical ring 29 serving to maintain the surrounding gasket in axially centered relation to the end plates. The testing fluid is delivered from tube 15 to the cavity 28 in body 11 through passages 30, and to the cavity and body 10 by way of passages 31.

The packer body assemblies may be re-enforced and interconnected by a plurality of tubular tie bolts 32 carrying nuts 33 removable to permit withdrawal of the end plates from either end of the assembly. As previously mentioned, it is desirable that provision be made for equalizing pressures in the pipe 13 beyond the packers. For this purpose tubular tie rods 32 may be used to provide passages extending openly through the rods for the transmission of fluid from one side to the other of the assembly, as the case may be.

Any suitable passage or port arrangement may be employed for delivering the testing fluid to chamber 16. As illustrative, such fluid delivery may occur through one or more openings 34 in the exposed length of the tube. As previously mentioned, it is desirable that the pressure increases in cavities 28 and chamber 16 occur sequentially in order that as pressure is communicated from the tube 12, gaskets 26 will be expanded into sealing engagement with the pipe 13 before the fluid in chamber 16 reaches full working or testing pressure. Such differential pressure increase may be accomplished by making openings 34 sufficiently smaller than passages 30 and 31, that the packers will have become fully expanded in advance of full pressure development in the intervening chamber.

External diameters of plates 18, 19, 23 and 24 may rather closely approach the internal diameter of the pipe so that if rested in the pipe, the packer assembly will have approximately centered relation, at least close enough for sealing expansion of the packers. Preferably the plate diameters will exceed the gasket diameters sufficiently to protect the outer surface of the gasket from wear or abrasion through sliding contact with the pipe. If desired, the assembly may be supported for movement within the pipe and maintenance in more accurately centered relation therewith, as by circular arrangements of rollers 36 carried on arms 37 fixed to the inner plates 18 and 23.

In operation, the apparatus is run into the pipe through one section that has just been welded at 14 to the adjacent section, to a location at which the packer bodies are positioned at opposite sides of the joint, as in Fig. 1. Delivery of testing fluid (either gas or liquid) under pressure through tubes 12 and 15 first expands the gaskets 26 to seal chamber 16 against fluid leakage. The fluid pressure then increases in the chamber to the working maximum, any leakage in the joint 14 being detectable by fluid escape at the outside of the pipe.

I claim:

1. A device for testing pipe joints, comprising a pair of spaced bodies insertible within the pipe and each containing a fluid receiving chamber, a radially expansible packer carried by each body and exposed to the pressure in said chamber, means including a tube connected to said bodies for communicating fluid pressure to said chambers for expansion of the packers into fluid tight engagement with the pipe at opposite sides of said joint, and means including differential size openings through which the maximum working pressure of said fluid is sequentially communicated to said chambers and to the space between said packers.

2. A device for testing pipe joints, comprising a tube insertible within the pipe and approximately coaxial therewith, spaced pairs of plates mounted radially of the tube with a pair of plates at each side of the joint, each plate having a diameter less than the pipe diameter, a radially expandible ring gasket between each pair of plates, centering means maintaining the peripheries of the gaskets coaxial with the pipe, means for communicating fluid pressure from said tube to cavities between said plates for expansion of said packers into fluid tight engagement with the pipe at opposite sides of the joint, and means for communicating said fluid pressure to the space between said pair of plates.

3. A device for testing pipe joints, comprising a tube having outlets, a pair of spaced supports carried by the tube and having apertures communicating with said outlets, said supports being insertible within the pipe at each side of the joint to provide between them a fluid pressure chamber, spaced plates carried by each support with a fluid receiving cavity therebetween in communication with said apertures, spacing rings between said side plates, a radially expandible ring gasket exposed to pressure of fluid within the cavity and held between said side plates with its periphery coaxial with the pipe wall, means to force fluid pressure through the inlet tube and through said communicating apertures into said cavity for expansion of the gasket into fluid tight engagement with the pipe, and means to pass fluid into said chamber under pressure to force fluid through any leak in the joint.

4. A device for testing pipe joints, comprising an elongated support insertible within the pipe, a pair of spaced inner plates extending radially of the support at each side of the pipe joint to provide between them a fluid pressure chamber, outer plates paired with said inner plates, a ring gasket between each pair of inner and outer plates, means holding the plates in rigid spaced relation to accommodate the gaskets between them, means to expand said ring gasket radially into fluid tight engagement with the pipe wall, and means to pass fluid into said chamber under pressure to force fluid through any leak in said joint.

5. A device for testing pipe joints, comprising an elongated support insertible within the pipe and having threaded extremities, a pair of spaced inner plates extending radially of the support at each side of the pipe joint to provide between them a fluid pressure chamber, outer plates paired with said inner plates, a ring gasket between each pair of inner and outer plates, means holding the plates in rigid spaced relation to accommodate the gaskets between them, said means including a pair of nuts on said threaded extremities of the support to engage and axially confine said outer plates, means to expand said ring gasket radially into fluid tight engagement with the pipe wall, and means to pass fluid into said chamber under pressure to force fluid through any leak in said joint.

6. A device for testing pipe joints, comprising an elongated support, a pair of spaced inner plates extending radially of the support and insertible within the pipe at each side of the joint to provide between them a fluid pressure chamber, a centering ring extending outwardly of each inner plate, radially expandible ring gaskets coaxially held by said centering rings, outer plates spaced from the inner plates by the spacing ring and cooperating with the inner plates to hold the gaskets between them, means removably holding said outer plates against said spacing ring, means to expand said gaskets into fluid tight engagement with the pipe wall, and means to pass fluid into said chamber under pressure to force fluid through any leak in said joint.

ELTING HENDERSON.

REFERENCES CITED

The following references are of record in the file of this patent:

UNITED STATES PATENTS

| Number | Name | Date |
|---|---|---|
| 1,221,733 | Henderson | Apr. 3, 1917 |
| 2,299,116 | Svirsky | Oct. 20, 1942 |

FOREIGN PATENTS

| Number | Country | Date |
|---|---|---|
| 201,435 | Great Britain | Aug. 2, 1923 |